United States Patent [19]

Folkins

[11] Patent Number: 5,548,391
[45] Date of Patent: Aug. 20, 1996

[54] PROCESS COLOR USING LIGHT LENS SCANNING TECHNIQUES

[75] Inventor: Jeffrey J. Folkins, Rochester, N.Y.

[73] Assignee: Xerox Corporation, Stamford, Conn.

[21] Appl. No.: 368,128

[22] Filed: Jan. 3, 1995

[51] Int. Cl.⁶ .................................................. G03G 15/01
[52] U.S. Cl. ..................... 355/326 R; 355/327; 430/42; 430/54
[58] Field of Search .............................. 355/326 R, 327, 355/328; 430/42, 54, 55

[56] References Cited

U.S. PATENT DOCUMENTS

| | | | |
|---|---|---|---|
| 3,832,170 | 8/1974 | Nagamatsu et al. | 355/211 X |
| 4,068,938 | 1/1978 | Robertson | 355/326 R |
| 4,078,929 | 3/1978 | Gundlach | 96/1.2 |
| 4,155,641 | 5/1979 | Sagara et al. | 355/235 |
| 4,189,224 | 2/1980 | Sakai | 355/326 |
| 4,264,185 | 4/1981 | Ohta | 355/326 |
| 4,335,194 | 6/1982 | Sakai | 430/42 |
| 4,367,945 | 1/1983 | Abe | 355/51 |
| 4,479,242 | 10/1984 | Kurata | 382/17 |
| 4,509,850 | 4/1985 | Weigl | 355/4 |
| 4,515,462 | 5/1985 | Yoneda | 355/326 R |
| 4,562,129 | 12/1985 | Tanaka et al. | 430/42 |
| 4,603,963 | 8/1986 | Hinton et al. | 355/235 |
| 4,731,313 | 3/1988 | Haneda | 430/42 X |
| 4,786,939 | 11/1988 | Haneda | 430/42 X |
| 4,803,514 | 2/1989 | Hiratsuka et al. | 430/42 X |
| 4,839,692 | 6/1989 | Shoji et al. | 355/327 X |
| 4,937,636 | 6/1990 | Rees et al. | 355/328 |
| 5,089,847 | 2/1992 | Folkins | 355/328 X |
| 5,452,074 | 9/1995 | VonHoene et al. | 355/326 R |
| 5,493,387 | 2/1996 | VonHoene et al. | 355/328 |

*Primary Examiner*—Matthew S. Smith

[57] ABSTRACT

Spot on spot color images in a single pass using a light lens copier are enabled. Image exposure is accomplished using light/lens scanning of a multi-color original document together with simultaneous shunting. Using a special photoreceptor configuration and a sequence of image creation steps including the aforementioned simultaneously shunting and exposure step, balanced latent images are formed across the photoreceptor structure. By balanced is meant that latent images exist across both an overcoat layer of the photoreceptor and the rest of the photoreceptor. Such an arrangement precludes development of the image across the overcoat layer if the photoreceptor were to be moved past a development system. Thus, an electrostatic voltmeter used to read the surface potential in the image areas would read zero or near zero volts. Following formation of the a plurality of balanced images, each of the balanced images is, one at a time, caused to become unbalanced prior to its movement past an appropriate development system. Subsequent to the development of each image except for the last one, the imaged area of the photoreceptor is subjected to corona emissions for the purpose of leveling the charge thereon not completely neutralized by development of that images. The unbalancing steps are effected using low resolution exposure devices such as bars or ROS devices. Simultaneous scanning of the original document using a Raster Input Scanner (RIS) provides information which is used by an information processor system for controlling the output of a plurality of low resolution exposure devices.

5 Claims, 1 Drawing Sheet

PROCESS COLOR USING LIGHT LENS SCANNING TECHNIQUES

BACKGROUND OF THE INVENTION

This invention relates generally to the creation of process color (i.e. spot on spot) images in a single pass and more particularly to the use of light lens image scanning techniques for such purposes.

In the document reproduction art, an original document to be reproduced is typically placed on a stationary platen and illuminated by a incremental line-scanning optical system. Reflected light rays from the document travel along an optical path and are projected by a lens on to a photosensitive imaging member thereby forming latent electrostatic image thereon. The latent image of the document formed on the imaging member is then developed by appropriate marking material such as toner, and then the developed image is transferred to a record medium such as plain paper. Various types of scanning mechanisms are known in the art, but the most widely used utilizes a pair of guide rails which are mounted in a parallel plane beneath the document platen. The scanning components are mounted on one or more movable scan carriages which are driven by a cable arrangement to run back and forth beneath the platen and supported by the guide rails. Examples of such prior art scanning systems employing an elongated illuminated lamp and scan mirrors to scan/illuminate the document are shown in U.S. Pat. Nos. 4,367,945, 4,155,641 and 4,603,963.

Alternatively, the document to be reproduced has been scanned by a Raster Input Scanner (RIS), typically a CCD sensor array. The RIS type scanner is supported for movement beneath the document platen and is moved in the scan, re-scan direction by a scan assembly basically similar to the ones used in the above-identified patents relating to light lens imaging.

Following is a discussion of additional prior art, incorporated herein by reference, which may bear on the patentability of the present invention. In addition to possibly having some relevance to the patentability thereof, these references, together with the detailed description to follow, may provide a better understanding and appreciation of the present invention.

U.S. Pat. No. 4,937,636 granted to Rees et al describes one technique that involves tri-level imaging in a light lens copier for creating highlight color images in a single pass. In that patent, an original to be copied is modified using fluorescent ink on selected portions thereof. Light reflected from the modified original is transmitted through a colored filter and is projected onto the surface of a monopolar photoreceptor. Light incident on the fluorescent ink is absorbed over a specific wavelength range and is re-admitted at a higher wavelength. This light, and light reflected from the white background, are transmitted through a filter of a color associated with the re-emited wavelength. Light reaching the photoreceptor discharges charged areas thereon at two energy levels. The resulting latent image incorporates three separate discharge levels corresponding to the black image information, color fluorescent areas, and background areas. The black and color areas are developed with appropriate colored toner by developer units biased at the appropriate levels. The requirement modifying an original using special inks presents a serious drawback to commercial acceptance of the process.

U.S. Pat. No. 3,832,170 Nagamatsu et al., describes a photosensitive member having an insulating layer acting as a color filter. The photoconductive drum is divided into three segments, each segment corresponding to a different colored electrostatic latent image. These differently colored electrostatic latent images are then developed by toner particles complementary in color thereto. The toner powder images are then transferred to a copy sheet in superimposed registration to form a multicolor copy corresponding to the original document.

U.S. Pat. No. 4,078,929 Gundlach, discloses a reproduction machine which can form a two color copy of an original document either using conventional light lens exposure techniques, or electronically. A charge pattern of a single polarity and having at least three different levels of potential is formed on a photoreceptor and developed in two colors by utilizing relatively negatively charged toner particles of one color and relatively positively charged toner particles of a second color. The exposure system requires the use of black and white images on an original document having a intermediate (grey) color.

U.S. Pat. No. 4,189,224 Sakai, discloses a photoconductive drum formed with first and second photoconductive layers of different spectral sensitivities. The photoconductive drum is charged and exposed causing electrostatic latent images to be formed on the respective layers according to the color within the original document. The charges of the latent images are of opposite polarity. Toner particles, similarly of opposite polarity, are used to develop the respective latent images. The toner particles of different colors. In this way, a two-color copy is formed.

U.S. Pat. No. 4,264,185 Ohta, describes an electrophotographic printing machine employing a photoconductive drum formed with at least two photoconductive layers of different spectral sensitivities. One layer may be panchromatic with the other layer being insensitive to red light. The drum is charged, at least twice, with opposite polarities to produce the charge pattern. A light image of the original document then exposes the charged regions of the drum. This results in positive and negative electrostatic latent images being recorded thereon. The latent images are developed with black and red toner particles of opposite polarity to form a two-color copy.

U.S. Pat. No. 4,335,194, Sakai, discloses a photoconductive member comprising a red sensitive photoconductive layer and a redinsensitive photoconductive layer. Two colors are printed by charging and exposing to white light, irradiating with red light and charging to an opposite polarity, charging to the same polarity as an opposite polarity, charging to the same polarity as the first polarity, and developing with red and black toners of opposite polarity.

U.S. Pat. No. 4,509,850, Weigl, teaches an electrophotographic printing machine capable of reproducing both black information and red information in a single pass. A continuously charged area and a modulated charged area are recorded onto a photoconductive surface. The modulated charged area is developed with polar or polarizable marking particles of a first color while the continuously charged area is developed with charged marking particles of a second color.

U.S. Pat. No. 4,479,242, Kurata, discloses a dichromatic reading device capable of separating a specific color from other colors of and original document. An electric circuit is provided which obtains the difference between the level of an image signal readout without a filter, and the level of a signal readout through a complementary filter for the specific color. Subsequently, an image signal for the specific color is produced from the difference.

U.S. Pat. No. 4,068,938, Robertson, teaches an electrophotographic printing machine capable of reproducing two color copies from a two color original document. An electrostatic latent image having three discrete potential levels is recorded onto a photoconductive drum. A high level is developed by particles of a first color corresponding to a dark color of the original document and a low level is developed by particles of a second color. The underdeveloped portion remains the color of the sheet of support material.

U.S. Pat. No. 4,562,129, Tanaka, discloses a bipolar photoreceptor which permits three different potential levels to be formed thereon.

U.S. patent application Ser. No. 08/301,922 discloses a twopass, light/lens, highlight color copier in which large contrast images are created providing relatively large development fields or potentials compared to those associated with tri-level imaging.

U.S. patent application Ser. No. 08/237,945 filed on May 2, 1994 discloses a method and apparatus for forming orthographic color images. A relatively high resolution ROS is utilized to simultaneously form a plurality full contrast images thereby yielding the registration precision available in tri-level imaging while providing full contrast images of conventional xerography as discussed above.

U.S. Pat. No. 5,493,387 granted to VonHoene et al on Feb. 20, 1996 discloses apparatus for creating highlight color images in a single pass using a light lens copier. Image exposure is accomplished using light/lens scanning of a multi-color original together with simultaneous shunting. Using a special overcoated photoreceptor configuration and a sequence of image creation steps including the aforementioned simultaneously shunting and exposure step, balanced latent images are formed across the photoreceptor structure. By balanced is meant that latent images exist across both an overcoat layer of the photoreceptor and the rest of the photoreceptor. Such an arrangement precludes development of the image across the overcoat layer if the photoreceptor were to be moved past a development system. Thus, an electrostatic voltmeter used to read the surface potential in the image areas would read zero or near zero volts. Following formation of the a plurality of balanced images, each of the balanced images is, one at a time, caused to become unbalanced prior to its movement past an appropriate development system. Such unbalancing is effected using a low resolution ROS or other suitable exposure device. Each low resolution ROS would provide full exposure sufficient to discharge the photoreceptor leaving the portion.

U.S. patent application Ser. No. 08/368,130 filed on Jan. 3, 1995 discloses apparatus for creating highlight color, gray scale imaging using light lens scanning of an original document. A Raster Input Scanner (RIS) which scans the original document is utilized for controlling the illumination intensity of one or more low resolution exposure devices. Information gathered by the RIS also controls the particular image area to be developed.

U.S. patent application Ser. No. 08/368,140 filed on Jan. 3, 1995 discloses highlight color imaging apparatus wherein the images which are formed in a single pass image are charge neutralized prior to subsequent exposure and development steps. A Photoreceptor image receiver is selectively discharged using low resolution exposure devices.

BRIEF SUMMARY OF THE INVENTION

In accordance with the present invention, there is provided a process color imaging apparatus which forms color on color images in a single pass using light/lens imaging techniques. To this end, an overcoated photoreceptor and image creation technique of the type described in U.S. Pat. No. 5,493,387 granted to VonHoene et al on Feb. 20, 1996 is employed. In that application, image exposure is accomplished with light/lens scanning of a multi-color original together with simultaneous shunting. Using a special overcoated photoreceptor configuration and a sequence of image creation steps including the aforementioned simultaneously shunting and exposure step, balanced latent images are formed across the photoreceptor structure. By balanced is meant that latent images exist across both an overcoat layer of the photoreceptor and the rest of the photoreceptor. Such an arrangement precludes development of the image across the overcoat layer if the photoreceptor were to be moved past a development system. Thus, an electrostatic voltmeter used to read the surface potential in the image areas would read zero or near zero volts.

Following formation of the plurality of balanced images, each of the balanced images is, one at a time, caused to become unbalanced prior to its movement past an appropriate development system. Such unbalancing is effected using an exposure device such as a low resolution image bar or other suitable exposure device such as a Raster Output Scanner (ROS). Each low resolution image bar provides full exposure sufficient to discharge the photoreceptor leaving the portion of the latent image to be developed across only the overcoating thereby enabling its development with the appropriate color toner. The output of each low resolution imaging bar or ROS is controlled using data gathered by simultaneously scanning an original document using a Raster Input Scanner (RIS). The RIS which comprises e.g. Red, Green and Blue sensing elements which in conjunction with information processing apparatus serves to generate appropriate electrical signals which are used for controlling the output of the low level exposure devices.

Recharging of the overcoated photoreceptor subsequent to the steps of unbalancing and developing each image except for the very last image is effective in leveling the photoreceptor voltage created during the unbalancing step and not totally neutralized during the development thereof.

The relative dielectric thicknesses of the overcoat and transport layers are chosen such that the image voltage, after recharge and reexposure steps, is not small compared with the initial exposure voltage. Thus, a developed spot on the photoreceptor can be reused thereby enabling spot on spot image creation. To this end, the overcoated photoreceptor is fabricated such that the dielectric thickness of the overcoat layer is small compared to the dielectric thickness of the transport layer.

It is also important to avoid imaging and development resolution loss due excessive fringing fields when the combination of the transport layer plus the overcoat dielectric thickness are too large.

Additionally, it is also important to maintain a sufficiently thick overcoat dielectric thickness compared with the desired toner size so that the toner image charge neutralization during development step is not so high as to disallow adequate development.

To provide the desired results the following criterion are observed:

$D'_t > 3d'_o$ $d'_t + d'_o < 30$ micro meter $d'_o > 0.3$ (average toner diameter)

where $d'_t$ = transport dielectric thickness $d'_o$ = overcoat dielectric thickness

DETAILED DESCRIPTION OF THE PREFERRED EMBODIMENT OF THE INVENTION

Figure 1B:
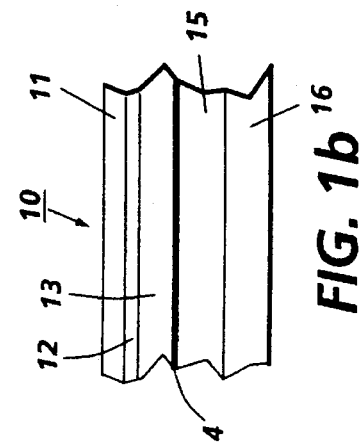
FIG. 1b depicts an enlarged end view of a photoreceptor belt.
Figure 1A:
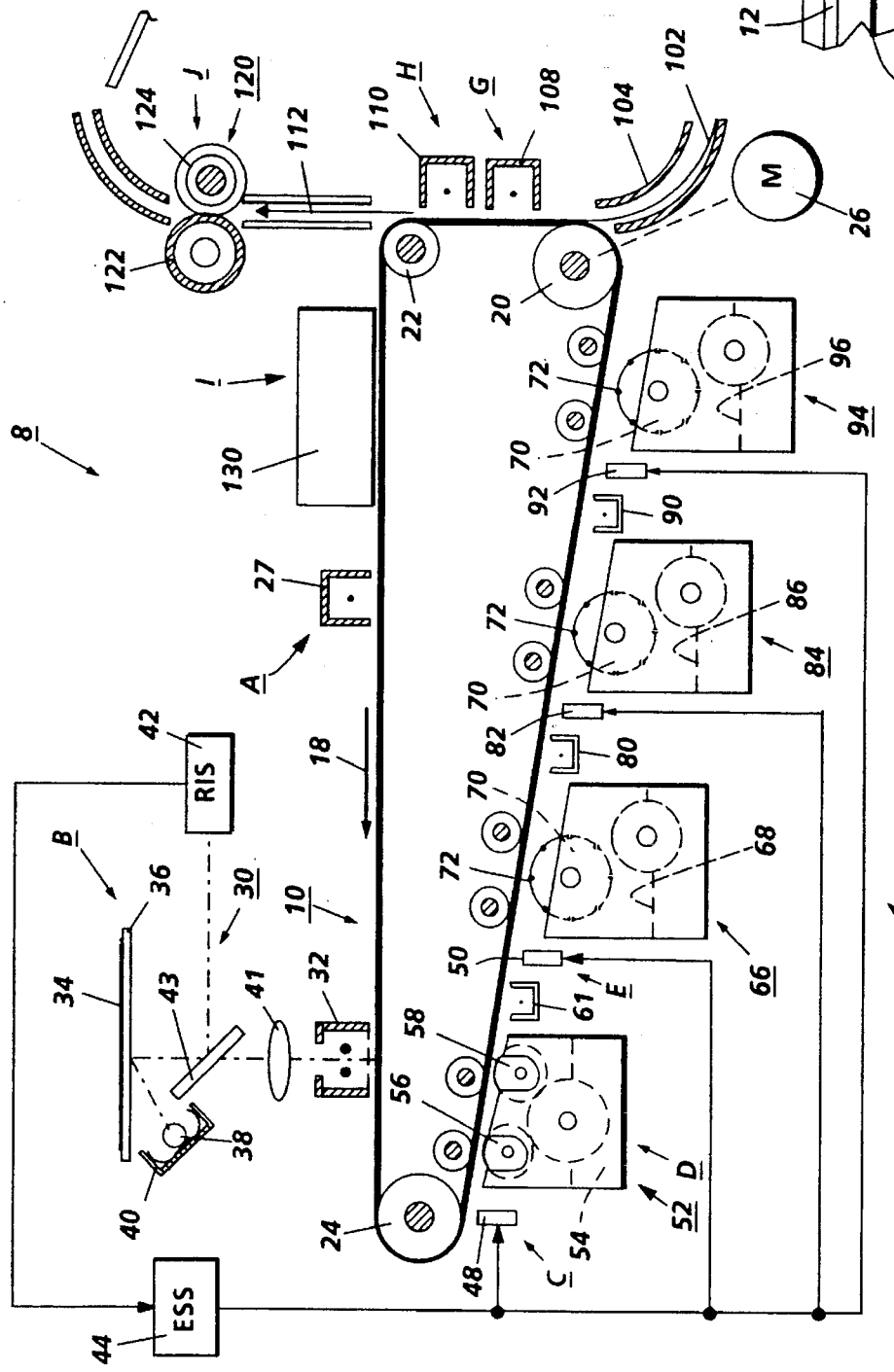
FIG. 1a depicts a schematic representation of a light lens creation device incorporating the invention.

As shown in FIG. 1, a process color printing apparatus in which the invention may be utilized comprises a xerographic processor module 8 including a charge retentive member in the form of a photoreceptor belt 10 which is mounted for movement in an endless path past a charging station A, a Light Lens (L/L) exposure station B, a first low resolution exposure station C, a first development station D, a second low resolution exposure station E, a second developer station F, a transfer station G, a Detack station H, a cleaning station l and a fusing station J.

The belt 10 (FIG. 2) comprises an overcoating layer 11 fabricated from a polycarbonate resin such as Makrolon™. An adhesive backed or thermally bonded layer can be used. The overcoating layer 11 serves to protect a binder generator layer (BGL) 12 fabricated by dispersing photoconductive particles such as trigonal selenium (tSe) into a film forming binder or polymer such as polyvinyl carbazole (PVK). The BGL has a thickness of >>2 microns. A transport layer 13 with suitable interfaces and fabricated from polyphenyl diame active small molecules which are molecularly dispersed into a polycarbonate resin binder such as Makrolon™ forms the other layer of the photoreceptor belt 10. The generating layer 12 can be placed above the transport layer 13. The layers 11, 12 and 13 are supported by a suitable polyester carrier layer 15 which is adhered to an anticurl back coating 16 fabricated from a polycarbonate resin. A ground plane 14 is provided intermediate the transport layer 13 and the carrier layer 15.

In accordance with the present invention, the relative thicknesses of the overcoat and transport layers are chosen such that the image voltage, after recharge and re-exposure steps, is not small compared with the initial exposure voltage. Thus, a developed spot on the photoreceptor can be reused thereby enabling spot on spot image creation. To this end, the overcoated photoreceptor is fabricated such that the thickness of the overcoat layer is small compared to the thickness of the transport layer.

It is also important to avoid imaging and development resolution loss due excessive fringing fields when the combination of the transport layer plus the overcoat dielectric thickness are tool large.

Additionally, it is also important to maintain a sufficiently thick overcoat dielectric thickness compared with the desired toner size so that the toner image charge neutralization during development step is not so high as to disallow adequate development.

Stated differently, the relative thicknesses of the overcoat and transport layers are chosen such that the ratio of the dielectric thickness of the overcoat layer to the dielectric thickness of the transport layer is in accordance with the following:

$D'_t > 3 d'_o$ $d'_t + d'_o < 30 \mu m$ $d'_o > 0.3$ (average toner diameter)

where $d'_t$ = transport dielectric thickenss $d'_o$ = overcoat dielectric thickness For example, typical dielectric constants for the polycarbonate and transport layers are approximately 3.0. Typical thicknesses for the overcoating and transport layers are 12 and 42 microns, respectively. For 7 micron toners, typically the dielectric thicknesses are 4 and 14 microns, respectively.

Belt 10 moves in the direction of arrow 18 to advance successive portions thereof sequentially through the various processing stations disposed about the path of movement thereof. Belt 10 is entrained about a plurality of rollers 20, 22 and 24, the former of which can be used as a drive roller and the latter of which can be used to provide suitable tensioning of the photoreceptor belt 10. Motor 26 rotates roller 20 to advance belt 10 in the direction of arrow 18. Roller 20 is coupled to motor 26 by suitable means such as a belt drive, not shown.

As can be seen by further reference to FIG. 1, initially successive portions of belt 10 pass through charging station A. At charging station A, a corona discharge structure comprising a DC scorotron 27 charges the belt 10 to a selectively high uniform negative potential. Providing a hole (+) injecting contact between the transport layer 13 and the ground plane 14 results in a reservoir of charge for collapsing the field across the photoreceptor. As a result, no flooding is needed as in the case of the second step of the Canon NP process. Because of the hole injection, the initial charging step leaves an image voltage across the overcoating. Material for the hole injecting contact as disclosed in U.S. Pat. No. 4,467,023 is contemplated.

Next, the charged portions of the photoreceptor surface are advanced through exposure station B where simultaneous imagewise exposure using a light/lens (L/L) scanning system generally indicated at 30 and AC shunting of the photoreceptor surface potential to zero volts with an AC scorotron 32 is effected. The L/L scanning system is used to scan an original document 34 on a platen 36. To this end, the L/L system is provided with an exposure lamp 38 supported by a reciprocating carriage 40, illumination from the lamp being projected onto the photoreceptor 10 through a lens 41. Alternatively, original document movement across the platen is contemplated.

A Raster Input Scanner (RIS) 42, generally of a low resolution type, is supported for movement with the L/L image exposure system 30 simultaneously scans the original document with the scanning effected by the exposure system 30. The RIS captures the entire original document and converts it to a series of raster scan lines and measures a set of primary color densities, e.g., red, green and blue densities, at each point of the original document. This information is transmitted to an image processing system (IPS) forming a part of an Electronic SubSystem (ESS) 44.

Operation of the scanning system 30 and scorotron 32 as well as other components of the processor 8 are operated under the control of the ESS 44. Document information captured by the RIS during scanning of the original document 34 and transmitted to the IPS is utilized for controlling the timing of energization of low resolution exposure devices, for example, image bars 48, 82 and 92. The data acquisition, data storage, and processing via the EES and IPS in carrying out this invention are well within the capabilities of present microprocessor-based machine controllers.

As the result of the simultaneous imagewise exposure and AC shunting the photoreceptor can be divided into images that can be developed with two or more different colored toners. The images are electrostatically balanced, meaning that if they were to be moved past a toner development system no development would occur. However, upon flood exposure of one of the images, with one of the low resolution devices 48, 50, 82 or 92, one of the images would become unbalanced and therefore developable.

After the simultaneous exposure and shunting step, the photoreceptor is moved past an image bar 48 which flood illuminates regions of the document to be developed using developer housing structure 52. The image bar 48 is a low (i.e. 10–100 spots per inch) resolution device. By way of example, the aforementioned regions may correspond to black images of the original. The image bar 48 operates to fully discharge the photoreceptor within a defined area thereof which corresponds to a first color image to be created. Thus, rather than operating in a pulsed (i.e."On"-"Off") mode it is operated in the continuously "On" mode except for being turned off at the boundaries delimiting the defined area. To this end the image bar 48 must be operative to turn off and on for the selected areas or regions within 0.01 to 0.1 inches of the aforementioned boundaries.

While one of the images formed is unbalanced after flood exposure and therefore capable of being developed using the developer housing structure 52, the other image or images remain balanced and undevelopable. Thus, when a balanced image passes the developer housing structure 52 it does not become developed.

By way of example, the developer housing structure 52 may contain a magnetic brush developer structure containing a developer mixture 54 of carrier particles and black toner particles. Thus, when the portion of the photoreceptor containing the unbalanced images, due to illumination with source 48, moves past the developer structure 52, black toner particles are deposited thereon, such deposition being effected with magnetic brush rollers 56 and 58. These toner particles are oppositely charged to the charge of the unbalanced image on the photoreceptor. Thus, they are positively charged. The developer housing structure 52 is electrically biased to a low negative bias voltage volts with a DC bias source, not shown.

Following development of the first unbalanced black image, the imaged area of the photoreceptor is moved past an AC corona discharge device 61 and subjected to corona emissions therefrom. The corona emissions serve to level the photoreceptor voltage created during the unbalancing step and not totally neutralized during the development thereof.

The photoreceptor is then moved past the low resolution image bar 50 which exposes regions of the photoreceptor corresponding to first color image areas thereby forming unbalanced color image areas to be developed using a non-interactive developer structure 66. The developer structure is preferably a non-interactive development system of the type disclosed in U.S. Pat. No. 5,010,367 granted to Dan A. Hays on Apr. 23, 1991. It is adapted to deposit a first color toner, for example, a subtractive primary color such as cyan, contained in a developer 68 onto developable image areas including those already developed with black toner particles. Its charge polarity is the toner 55 same as the charge on the black toner contained in developer mixture 54. Development of spot on spot toner images is enabled by virtue of the ratio of the thicknesses of the overcoat layer 11 and the transport layer 12 as noted above.

Areas of the photoreceptor to be developed with magenta toner are prepared for such development as the imaged portions of the photoreceptor are moved past a corona discharge device 80 similar to the device 61 and a low resolution image bar 82. The areas so prepared, including areas already developed with other toners, are then developed using developer structure 84 containing magenta toner 86. The developer structure 84 which is similar to the structure 66 except for the color of the toner dispensed thereby comprises an embedded donor roll structure 70 with electrodes 72.

Areas of the photoreceptor to be developed with yellow toner are prepared for such development as the imaged portions of the photoreceptor are moved past a corona discharge device 90 similar to the device 61 and a low resolution image bar 92. The areas so prepared, including areas already developed with other toners, are then developed using developer structure 94 containing yellow toner 96. The developer structure 94 which is similar to the structure 66 except for the color of the toner dispensed thereby also comprises an embedded donor roll structure 70 with electrodes 72.

Preferably, the non-interactive developer structure is of the type disclosed in U.S. Pat. No. 5,172,170 granted to Hays et al on Dec. 15, 1992. It comprises an embedded donor roll structure 70. An AC/DC electrical biasing arrangement, not shown, is provided for applying suitable voltage biases for liberating toner particle from the donor roll surface for forming a cloud of toner in a development zone 72 intermediate the photoreceptor and the donor roll structure. The biasing arrangement also controls the spacing of the toner cloud relative to the photoreceptor. Because the polarity of the developed black image is at a low negative voltage, approximately equal to the developer bias for the developer structure 52, the positive color toner particles do not deposit on that image. The bias of the non-interactive system could be set higher (i.e. more negative) than that of the initial black station to insure no color development on top of the black image. There would be sufficient color development potential remaining after the increased color bias is used.

Subsequent to image development a sheet of support material 102 is moved through a chute 104 into contact with the toner image at transfer station G. The sheet of support material is advanced to transfer station 6 by conventional sheet feeding apparatus comprising a part of the paper handling module, not shown. Preferably, the sheet feeding apparatus includes a feed roll contacting the uppermost sheet of a stack copy sheets. The feed rolls rotate so as to advance the uppermost sheet from stack into a chute which directs the advancing sheet of support material into contact with photoconductive surface of belt 10 in a timed sequence so that the toner powder image developed thereon contacts the advancing sheet of support material at transfer station G.

Transfer station G includes a transfer dicorotron 108 which sprays negative ions onto the backside of sheet 102. This attracts the positively charged toner powder images from the belt 10 to sheet 102. A detacting station H, comprising a detack dicorotron 110, is also provided for facilitating stripping of the sheets from the belt 10.

After transfer, the sheet continues to move, in the direction of arrow 112, onto a conveyor (not shown) which advances the sheet to fusing station J. Fusing station J includes a fuser assembly, indicated generally by the reference numeral 120, which permanently affixes the transferred powder image to sheet 102. Preferably, fuser assembly 120, comprises a heated fuser roller 122 and a backup roller 124. Sheet 102 passes between fuser roller 122 and backup roller 124 with the toner powder image contacting fuser roller 122. In this manner, the toner powder image is permanently affixed to sheet 102 after it is allowed to cool. After fusing, a chute, not shown, guides the advancing sheets 102 to catch trays (not shown) for subsequent removal from the printing machine by the operator.

After the sheet of support material is separated from photoconductive surface of belt 10, the residual toner particles carried by the non-image areas on the photoconductive surface are removed therefrom. These particles are removed at cleaning station I. A cleaning housing 130 supports therewithin a cleaning brush (not shown) supported in cleaning relationship with photoreceptor belt 10. The brush is generally cylindrical in shape, with a long axis arranged generally parallel to photoreceptor belt 10, and transverse to photoreceptor movement direction 16. The brush, has a large number of insulative fibers mounted on a base journaled for rotation (driving elements not shown). The brush is typically detoned using a pair of detoning rolls, not shown. The toner so removed is transported with air moved by a vacuum source (not shown) through the gap between the housing and photoreceptor belt 10, through the insulative fibers and exhausted through a channel, not shown. A typical brush rotation speed is 1300 rpm, and the brush/photoreceptor interference is usually about 2 mm. Pre and post cleaning corona and/or illumination (not shown) are contemplated where needed.

What is claimed is:

1. Apparatus for creating process color images on a charge retentive surface in a single pass, said apparatus comprising:

a. means supporting a charge retentive surface for movement in an endless path, said charge retentive surface comprising a sandwich comprising overcoat, charge generation and transport layers wherein the thickness of said transport layer is large compared to the thickness of said overcoat layer whereby an image voltage after exposure and recharge is not substantially less than an initial exposure voltage;

b. means for moving said charge retentive surface past a plurality of process stations including a charging station where said charge retentive surface is uniformly charged;

c. means for scanning a multi-color original document to selectively discharge said charge retentive surface for forming a plurality of balanced electrostatic images therein, d. means for simultaneously, with the forming of said balanced images, scanning said multi-color original with a raster input scanner for producing series of raster scan lines;

e. illumination means for exposing one of said balanced images for rendering it unbalanced whereby there is an electrostatically developable voltage across said charge retentive surface;

f. means for using said series of scan lines for controlling operation of said illumination means such that only one of said balanced images becomes an unbalanced image;

g. means for developing said unbalanced image using electrostatically attractable toner particles;

h. means for recharging said charge retentive surface for neutralizing any voltage remaining across said charge retentive surface; and i. means for illuminating another one of said balanced images for forming another unbalanced image;

j. means for developing said another unbalanced image.

2. Apparatus according to claim 1 wherein a thicknesses of said overcoat and transport layers is less than 30 μm and a dielectric thickness of said transport layer is greater than three times a dielectric thickness of said overcoat layer.

3. Apparatus according to claim 2 including means for illuminating still another one of said balanced images for forming yet another unbalanced image; and and means for developing said yet another unbalanced image.

4. Apparatus according to claim 3 wherein illumination means comprise low resolution exposure devices.

5. Apparatus according to claim 4 wherein said low resolution exposure devices comprise image bars.

* * * * *